(12) United States Patent
Janhunen

(10) Patent No.: US 10,947,891 B2
(45) Date of Patent: Mar. 16, 2021

(54) INTERNAL COMBUSTION ENGINE AND METHOD OF OPERATING AN INTERNAL COMBUSTION ENGINE

(71) Applicant: Timo Janhunen, Helsinki (FI)

(72) Inventor: Timo Janhunen, Helsinki (FI)

(*) Notice: Subject to any disclaimer, the term of this patent is extended or adjusted under 35 U.S.C. 154(b) by 0 days.

(21) Appl. No.: 16/469,657

(22) PCT Filed: Dec. 8, 2017

(86) PCT No.: PCT/FI2017/050871
§ 371 (c)(1),
(2) Date: Jun. 14, 2019

(87) PCT Pub. No.: WO2018/109267
PCT Pub. Date: Jun. 21, 2018

(65) Prior Publication Data
US 2020/0080469 A1 Mar. 12, 2020

(30) Foreign Application Priority Data
Dec. 15, 2016 (FI) ...................................... 20160285

(51) Int. Cl.
*F02B 37/18* (2006.01)
*F02D 41/00* (2006.01)
(Continued)

(52) U.S. Cl.
CPC .......... *F02B 37/18* (2013.01); *F02D 41/0007* (2013.01); *F02D 13/0257* (2013.01);
(Continued)

(58) Field of Classification Search
CPC .... F02B 37/18; F02B 37/013; F02D 41/0007; F02D 13/0257; F02D 23/00; F02D 2041/001; F02M 26/05
(Continued)

(56) References Cited

U.S. PATENT DOCUMENTS 2,431,563 A * 11/1947 Johansson ............... F02B 37/18
60/602
5,417,068 A 5/1995 Olofsson
(Continued)

FOREIGN PATENT DOCUMENTS

DE 3821935 A1 2/1990
DE 3821937 A1 2/1990
(Continued)

OTHER PUBLICATIONS

Janhunen: HCCI-Combustion in the Z Engine—Part II. SAE Technical Paper Series, Sep. 10, 2012. vol. 1, XP055701205, ISSN: 0148-7191, DOI: 10.4271/2012-01-1573.
(Continued)

*Primary Examiner* — Thai Ba Trieu
(74) *Attorney, Agent, or Firm* — Laine IP Oy

(57) ABSTRACT

According to an aspect of the present invention, there is provided a combustion engine comprising a first exhaust gas channel and a separate second exhaust gas channel each connected to at least one cylinder, wherein the first exhaust gas channel is further connected to a turbocharger and the second exhaust gas channel is configured to bypass the turbocharger, and a throttling valve in the second exhaust gas channel configured to control an exhaust gas pressure in the cylinder.

11 Claims, 6 Drawing Sheets

(51) Int. Cl.
*F02D 13/02* (2006.01)
*F02D 23/00* (2006.01)
*F02M 26/05* (2016.01)

(52) U.S. Cl.
CPC ........ *F02D 23/00* (2013.01); *F02D 2041/001* (2013.01); *F02M 26/05* (2016.02)

(58) Field of Classification Search
USPC .................................................. 60/602, 612
See application file for complete search history.

(56) References Cited

U.S. PATENT DOCUMENTS

| | | | | |
|---|---|---|---|---|
| 5,819,693 | A * | 10/1998 | Curtil | F02D 13/0246 123/65 BA |
| 6,286,467 | B1 * | 9/2001 | Ancheta | F02B 69/06 123/21 |
| 6,415,600 | B1 * | 7/2002 | Lejon | F02B 37/18 60/602 |
| 6,742,506 | B1 | 6/2004 | Grandin | |
| 8,087,243 | B2 | 1/2012 | Schmitz | |
| 8,276,365 | B2 * | 10/2012 | Hokuto | F02B 37/18 60/280 |
| 8,495,992 | B2 * | 7/2013 | Roth | F02D 13/0249 60/612 |
| 8,627,659 | B2 * | 1/2014 | Straub | F02D 23/00 60/602 |
| 9,121,330 | B2 * | 9/2015 | Straub | F02B 37/18 |
| 9,133,795 | B2 * | 9/2015 | Riley | F02D 13/0249 |
| 2009/0223220 | A1 * | 9/2009 | Vuk | F02D 13/0249 60/602 |
| 2011/0094486 | A1 * | 4/2011 | Vuk | F02B 37/013 60/605.2 |
| 2014/0230430 | A1 * | 8/2014 | Krug | F02B 37/013 60/600 |
| 2014/0261261 | A1 | 9/2014 | Straub | |
| 2014/0373816 | A1 | 12/2014 | Nagar | |
| 2018/0355824 | A1 * | 12/2018 | Springer | F02B 37/18 |

FOREIGN PATENT DOCUMENTS

| | | |
|---|---|---|
| DE | 10235134 A1 | 2/2004 |
| DE | 102008036308 A1 | 2/2010 |
| FR | 2990471 A1 | 5/2014 |
| GB | 2185286 A | 7/1987 |
| WO | WO2009001189 A1 | 12/2008 |
| WO | WO2009105463 A2 | 8/2009 |

OTHER PUBLICATIONS

Janhunen: HCCI-Combustion in the Z Engine. SAE Technical Paper Series, Apr. 16, 2012. SAE Technical Paper Series, SAE Technical Paper Series, vol. 1. XP055701240, ISSN: 0148-7191, DOI: 10.4271/2012-01-1132.

* cited by examiner

INTERNAL COMBUSTION ENGINE AND METHOD OF OPERATING AN INTERNAL COMBUSTION ENGINE

FIELD

The present invention relates to an internal combustion engine. Further, the present invention relates to a method of operating an internal combustion engine.

BACKGROUND

When closing exhaust valves of a combustion engine, a certain amount of exhaust gas remains in the cylinders, especially in combustion engines comprising a turbocharger, because the counter-pressure of the turbocharger raises the pressure of the combustion gases in the cylinder during the exhaust stroke compared to engines that are not equipped with turbochargers. The high pressure in the cylinder of the engine can interfere with the injection of fuel into the cylinder, for example, using a nozzle that forms a thin, conical, short penetration jet into the cylinder.

It is well known in the field that injection of fuel at a cylinder pressure of more than 3 bar using the aforementioned nozzle significantly hinders the vaporization of the fuel, for example, when seeking to create a homogeneous (gas-)fuel mixture for so-called homogeneous combustion in the engine. In certain conditions, homogeneous combustion permits the free combustion of particles and nitrogen oxide (NOx) in engines, making it possible to avoid almost entirely the expensive further processing of exhaust gases.

Document DE 3821937 A1 discloses that in an internal combustion engine with valve timing gear with two exhaust ports per cylinder, which are each controlled by one exhaust valve respectively, and with an exhaust turbocharger, the turbine of which can be bypassed by a bypass line, controlled by a blow-off valve, for the purpose of limiting the charge pressure, the first exhaust port of each cylinder is connected by way of an exhaust line to the turbine inlet and the second exhaust port of each cylinder to the bypass line. The cross-section of the exhaust line is designed solely for the exhaust gas mass flow needed for the maximum admissible charge pressure. As a result, a high rate of flow for the exhaust gases entering the turbine and a rapid response of the exhaust turbocharger are achieved.

Further, document U.S. Pat. No. 5,417,068 A describes an exhaust flow system for a split exhaust flow in a multi-cylinder internal combustion engine fitted with an exhaust-driven supercharger of the turbocompressor type, whose exhaust system incorporates a catalytic exhaust cleaner, where each cylinder of the engine has both a first exhaust valve, from which released exhaust gas is fed to a first exhaust collector common to the cylinders, which collector is connected directly to the exhaust turbine inlet by a first exhaust branch pipe, and a second exhaust valve, from which released exhaust gas is fed to an exhaust pipe, which incorporates a silencer. At least one valve adjustable according to the operating conditions of the engine, is arranged downstream from the second exhaust valves of the cylinders, in their connection to the exhaust pipe between the exhaust turbine outlet and the silencer. The aim of this construction is to prevent the negative influence of the other cylinders with regards to emptying exhaust gases from the cylinder.

Furthermore, document DE 102008036308 A1 teaches an engine having exhaust gas turbochargers comprising two outlet valves arranged at each of multiple cylinders. The outlet valves of each cylinder are integrated to two groups. Exhaust gas is guided from the outlet valves to the exhaust gas turbochargers over exhaust gas channels that are attached to the group. A variable valve controller controls opening times of the exhaust gas valves depending on operating conditions of the engine. The exhaust gas turbochargers are equally dimensioned.

Additionally, document DE 3821935 A1 discloses an internal combustion engine with valve timing gear with two exhaust ports per cylinder and with an exhaust turbocharger, the first exhaust ports of all cylinders are connected to the turbine inlet and the second exhaust ports of all cylinders to a bypass line bypassing the turbine. The second exhaust valves are opened later than the first exhaust valves, so that the greater portion of the exhaust gas energy can be used to drive the exhaust gas turbine. On opening of the second exhaust valves, a portion of the exhaust gas mass flow is led past the exhaust gas turbine, thereby limiting the charge pressure. The second exhaust valves are preferably provided with a variable valve timing gear, which on attainment of a certain charge pressure shifts the opening point towards earlier opening and/or increases the valve lift.

In view of the foregoing, it would be beneficial to provide a combustion engine and a method of operating a combustion engine, wherein the amount of exhaust gas remaining in the cylinders of the combustion engine can be controlled and/or reduced. The system should be capable of being manufactured in industrial scale.

SUMMARY OF THE INVENTION

The invention is defined by the features of the independent claims. Some specific embodiments are defined in the dependent claims.

According to a first aspect of the present invention, there is provided a combustion engine comprising a first exhaust gas channel and a separate second exhaust gas channel each connected to at least one cylinder, wherein the first exhaust gas channel is further connected to a turbocharger and the second exhaust gas channel is configured to bypass the turbocharger, and a throttling valve in the second exhaust gas channel configured to control an exhaust gas pressure in the cylinder.

Various embodiments of the first aspect may comprise at least one feature from the following bulleted list:
- the combustion engine is a two-stroke engine
- the second exhaust gas channel is connected to the first exhaust gas channel at a position downstream of the turbocharger
- the throttling valve is configured to control a gas flow in the second exhaust gas channel
- the combustion engine further comprises a first exhaust gas valve configured to control an exhaust gas flow from the cylinder to the first exhaust gas channel and a second exhaust gas valve configured to control an exhaust gas flow from the cylinder to the second exhaust gas channel
- the second exhaust gas valve is configured to be opened as a piston begins to move upwards in the cylinder
- the second exhaust gas valve is configured to be closed as the first exhaust valve is closed
- the second exhaust gas valve is configured to be closed earlier than 60 crank degrees before a piston's top dead center
- the combustion engine comprises a controllable compressor the compressor is configured to provide the cylinder with a gas charge under high pressure the combustion engine is configured to provide the cylinder with a gas charge in the range between 60-30 crank degrees, for example 60-40 crank degrees, before a piston's top dead center the combustion engine is configured to provide the cylinder with a gas charge subsequent to closing of the first and second exhaust gas valves the throttling valve is configured to control a temperature of a mixture in the cylinder the throttling valve is configured to control an amount of exhaust gas remaining in the cylinder the combustion engine comprises a first intercooler at a position upstream from the compressor the combustion engine comprises a second intercooler at a position downstream from the compressor the combustion engine comprises a controllable intercooler bypass configured to bypass the second intercooler According to a second aspect of the present invention, there is provided a method of operating an internal combustion engine, the method comprising opening a first exhaust gas valve which is connected to a first exhaust gas channel, wherein the first exhaust gas channel is connected to a turbocharger, opening a second exhaust gas valve which is connected to a separate second exhaust gas channel, wherein the second exhaust gas channel is configured to bypass the turbocharger, and controlling an exhaust gas pressure in at least one cylinder by a throttling valve.

Various embodiments of the second aspect may comprise at least one feature from the following bulleted list:

a two-stroke engine is operated the second exhaust gas channel is connected to the first exhaust gas channel at a position downstream of the turbocharger a gas flow in the second exhaust gas channel is controlled by the throttling valve an exhaust gas flow from the cylinder to the first exhaust gas channel is controlled by a first exhaust gas valve and an exhaust gas flow from the cylinder to the second exhaust gas channel is controlled by a second exhaust gas valve the second exhaust gas valve is opened as a piston begins to move upwards in the cylinder the second exhaust gas valve is closed as the first exhaust valve is closed the second exhaust gas valve is closed earlier than 60 crank degrees before a piston's top dead center air is compressed by a compressor air is compressed by a turbocharger the cylinder is provided with a gas charge under high pressure by the compressor the cylinder is provided with a gas charge in the range between 60-30 crank degrees, for example 60-40 crank degrees, before a piston's top dead center the cylinder is provided with a gas charge subsequent to closing of the first and second exhaust gas valves a temperature of a mixture in the cylinder is controlled by the throttling valve an amount of exhaust gas remaining in the cylinder is controlled by the throttling valve induction air heat created by the turbocharger is reduced by a first intercooler at a position upstream from the compressor induction air heat created by the compressor is reduced by a second intercooler at a position downstream from the compressor induction air is guided to the cylinder completely or partially through an intercooler bypass configured to bypass the second intercooler induction air is guided to the cylinder completely or partially through the second intercooler Considerable advantages are obtained by means of certain embodiments of the present invention. An internal combustion engine and a method of operating an internal combustion engine are provided. According to certain embodiments, the present invention is directed to a so called Z-motor. In particular, a two-stroke engine comprising a first exhaust gas channel connecting at least one cylinder and a turbocharger as well as a second exhaust gas channel connected to the cylinder and bypassing the turbocharger, wherein a throttling valve is arranged in the second exhaust gas channel by means of which the pressure in the cylinder can be controlled. Therefore, free burning of particles and NOx can take place according to certain embodiments of the present invention. Consequently, after-treatment of exhaust gas can be completely or nearly completely avoided.

Additionally, the future temperature of the mixture in the cylinder can be controlled by the throttling valve. Further, also the ignition sensitivity of the mixture in the cylinder can be controlled by the throttling valve.

EMBODIMENTS

Figure 1:
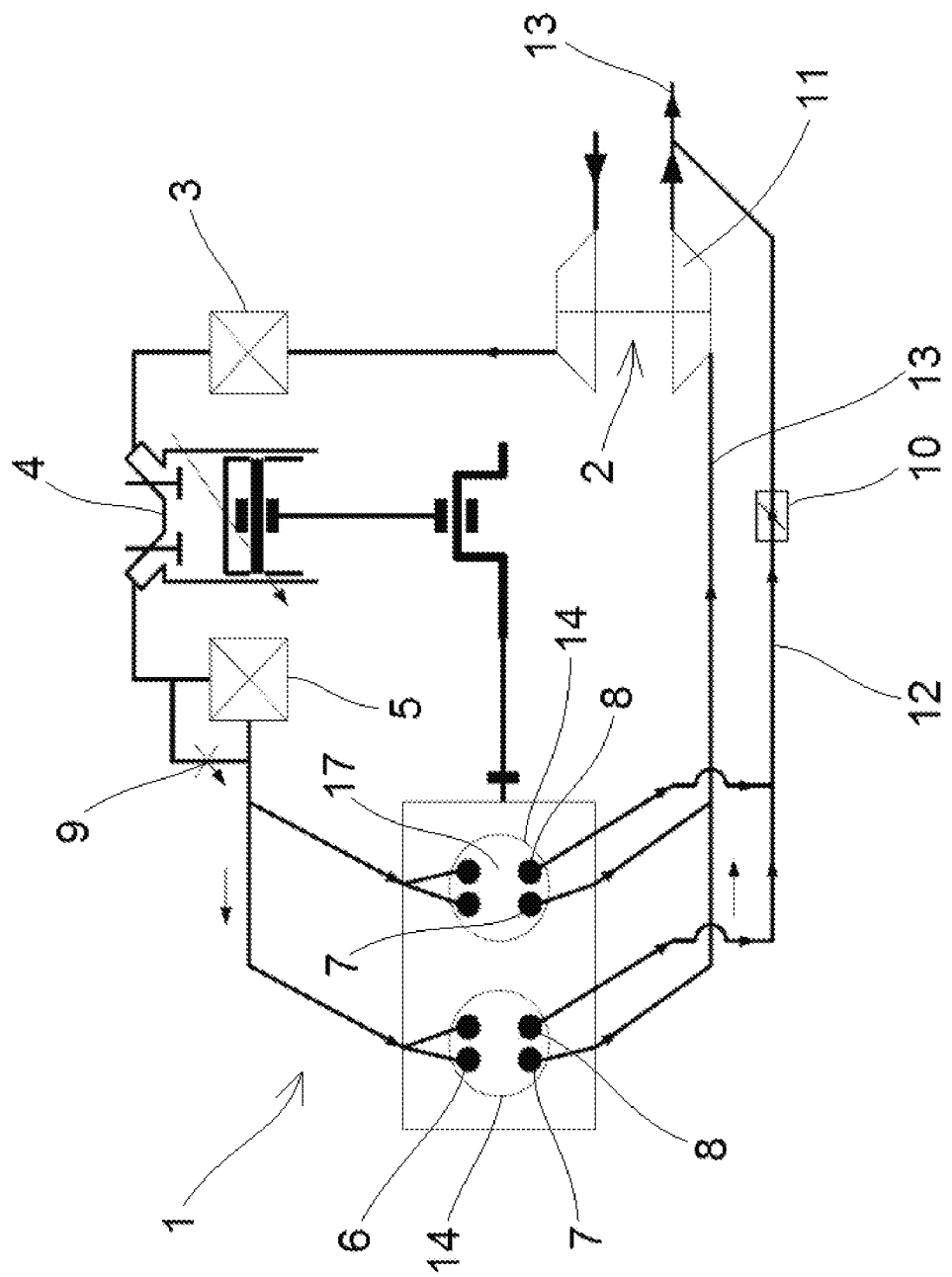
FIG. 1 illustrates a schematic view of a combustion engine in accordance with at least some embodiments of the present invention.

In FIG. 1 a schematic view of a combustion engine 1 in accordance with at least some embodiments of the present invention is illustrated. The internal combustion engine 1 is a two-stroke engine, for example a Z-motor, and comprises a turbocharger 2 configured to force air into a compressor 4 of the engine 1. The turbocharger 2 is connected to a controllable compressor 4 via a first intercooler 3. A mass flow of induction air can be adjusted by the compressor 4. Pressure, temperature, and density of the air can be increased by the compressor 4. The first intercooler 3 is configured to reduce induction air heat created by the turbocharger 2. The compressor 4 is further connected to at least one cylinder 14 of the combustion engine 1 via a second intercooler 5. The second intercooler 5 is configured to reduce induction air heat created by the compressor 4. Additionally, a controllable intercooler bypass 9 is provided. The second intercooler 5 can be bypassed partially or completely by the intercooler bypass 9 in order to allow induction air to directly flow from the compressor 4 to the combustion chamber 17 provided in the at least one cylinder 14 of the combustion engine 1, if required. The induction air is guided into the cylinders 14 of the combustion engine 1 via inlet valves 6. At least one inlet valve 6 is provided for each cylinder 14 in the shown embodiment.

Further, each cylinder 14 comprises a first exhaust valve 7 and a second exhaust valve 8. When the piston (not shown) is moving upwards in the cylinder 14, the combustion gases are pushed out of the cylinder 14 to the turbocharger 2 through the engine's exhaust valves 7 against the turbocharger's counter pressure until the exhaust valves 7 close, i.e. typically earlier than 60 degrees before the piston's top dead centre. The majority of exhaust gases is guided from each cylinder 14 to a single main exhaust channel or exhaust duct 13 which is connected to the turbocharger 2 and further provides an exit for the exhaust gases from the combustion engine 1.

In order to reduce the pressure of the combustion gases in the cylinder 14, an additional second exhaust valve 8 is installed in the cylinder 14. From each cylinder 14 exhaust gases can be guided to a single turbine bypass channel or bypass duct 12 which leads past the turbocharger's turbine 11 and then connects to the exhaust duct 13 coming from the turbocharger's turbine 11. In the part of the exhaust duct 13 subsequent to the turbocharger's turbine 11 a low counter pressure prevails of nearly ambient atmospheric pressure. The turbine bypass duct 12 further comprises an adjustable throttle valve 10.

The second exhaust valve 8, by means of which combustion gases are capable of bypassing the turbocharger's turbine 11, is configured to start to open when the piston is close to the bottom dead center, typically when the piston begins to move upwards during the exhaust of combustion gases from the cylinder 14, and typically closes at the same time as the first exhaust valves 7, which take exhaust gases to the turbocharger's turbine 11, i.e. typically earlier than 60 degrees before the piston's top dead centre. The pressure in the cylinder 14 may be, for example, in the range between 3 bar and 4 bar, when the second exhaust valve 8 starts to open.

By controlling the aforementioned throttle valve 10 in the exhaust duct 12, which is connected to the combustion engine's 1 second exhaust valves 8, the pressure and amount of exhaust gas remaining in the cylinders 14 can be controlled or adjusted. Additionally, the future temperature and ignition sensitivity of the mixture 18 in the cylinder 14, when the piston has compressed the mixture at the piston's 15 top dead centre, can be controlled or adjusted.

A new gas charge is then brought to the cylinder 14 under high pressure, about 60-30 crank degrees or about 60-40 crank degrees before the piston's top dead centre. The first and second exhaust valves 7, 8 have been already closed before that.

Computer simulations and a test engine have shown that operation of an internal combustion engine 1 as described in this document works. For example, the combustion engine's 1 maximum rotation speed may be about 3500 rpm so that it needs only one exhaust valve 7. There is therefore space, e.g., in the cylinder head of the engine 1, for the turbocharger's turbine's bypass exhaust valve 8 and its turbine bypass duct 12.

Figure 2A:
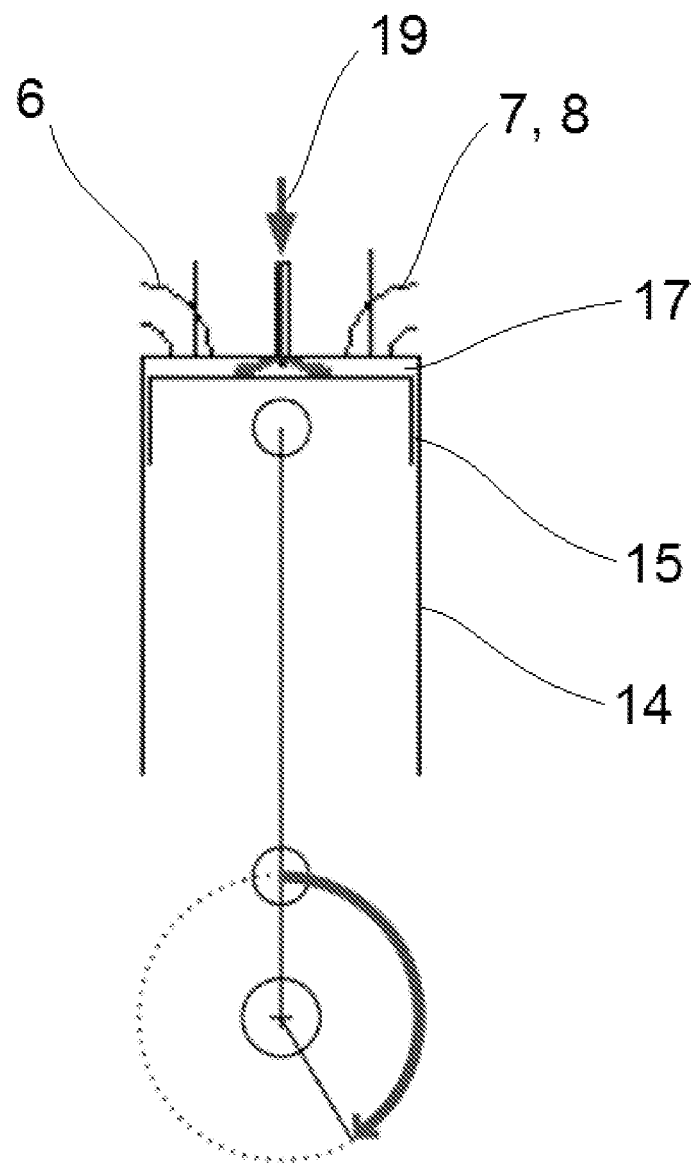
FIG. 2A illustrates a schematic cross sectional view of a cylinder of a combustion engine in accordance with at least some embodiments of the present invention during ignition fuel injection, combustion and work stroke.

In FIG. 2A a schematic cross sectional view of a cylinder 14 of a combustion engine in accordance with at least some embodiments of the present invention during ignition fuel injection, combustion and work stroke is illustrated. The moment of ignition of the mixture can then be controlled by various external methods, e.g., using a spark plug, or an injection of an ignition fuel 19 as shown in FIG. 2A.

Figure 2B:
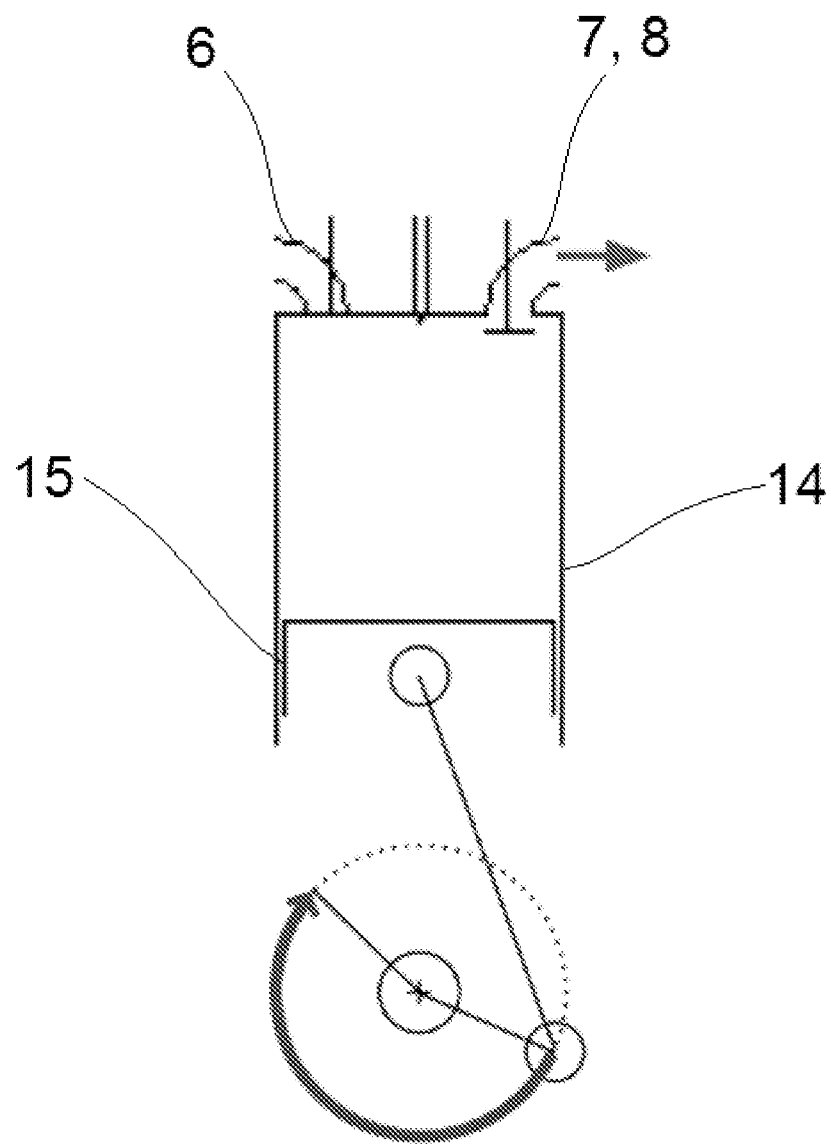
FIG. 2B illustrates a schematic cross sectional view of a cylinder of a combustion engine in accordance with at least some embodiments of the present invention during the exhaust stroke.

In FIG. 2B a schematic cross sectional view of a cylinder 14 of a combustion engine in accordance with at least some embodiments of the present invention during the exhaust stroke is illustrated. When the engine's exhaust valve 7 opens, typically about 50-60 crank-angle degrees before the piston's 15 bottom dead centre, a rapid reduction in cylinder pressure, a so-called blowdown, occurs. This pressure pulse, which lasts for about 60-80 crankshaft degrees, contains as much as 70% of the turbocharger's potential energy, when using a so-called pulse-turbocharger. After this, the upwards moving piston 15 pushes the combustion gases out of the cylinder 14 to the turbocharger 2 through the engine's exhaust valves 7 against the turbocharger's counter pressure, which is typically 2-4 bar, until the exhaust valves 7 close. Typically, the exhaust valves 7 close earlier than 60 degrees before the piston's top dead centre. In such a case, a significant amount of combustion gas remains in the cylinder 14, the pressure of which is about the same as the turbocharger's counter pressure.

The combustion engine further comprises a second exhaust valve 8 which is connected to a second exhaust gas channel. The second exhaust gas channel bypasses the turbocharger 2. A throttling valve 10 is arranged in the second exhaust gas channel 12. The throttling valve 10 is configured to control a pressure in the cylinder 14. As the pressure at the exit of the exhaust gas channel 13 is the pressure of ambient air, the amount of combustion gas remaining in the cylinder 14 can be consequently reduced by the combination of a second exhaust valve, a second exhaust gas channel, and the throttling valve.

Figure 2C:
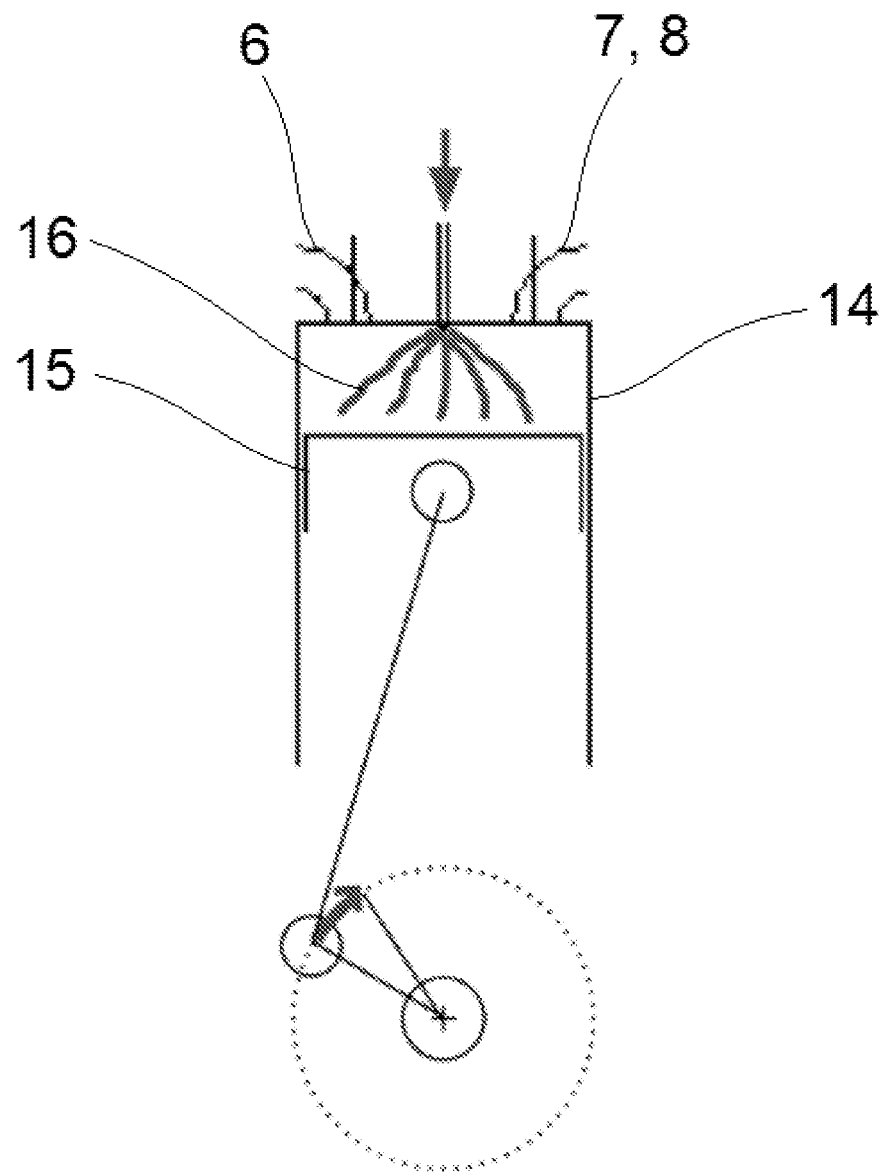
FIG. 2C illustrates a schematic cross sectional view of a cylinder of a combustion engine in accordance with at least some embodiments of the present invention during fuel injection.
Figure 2D:
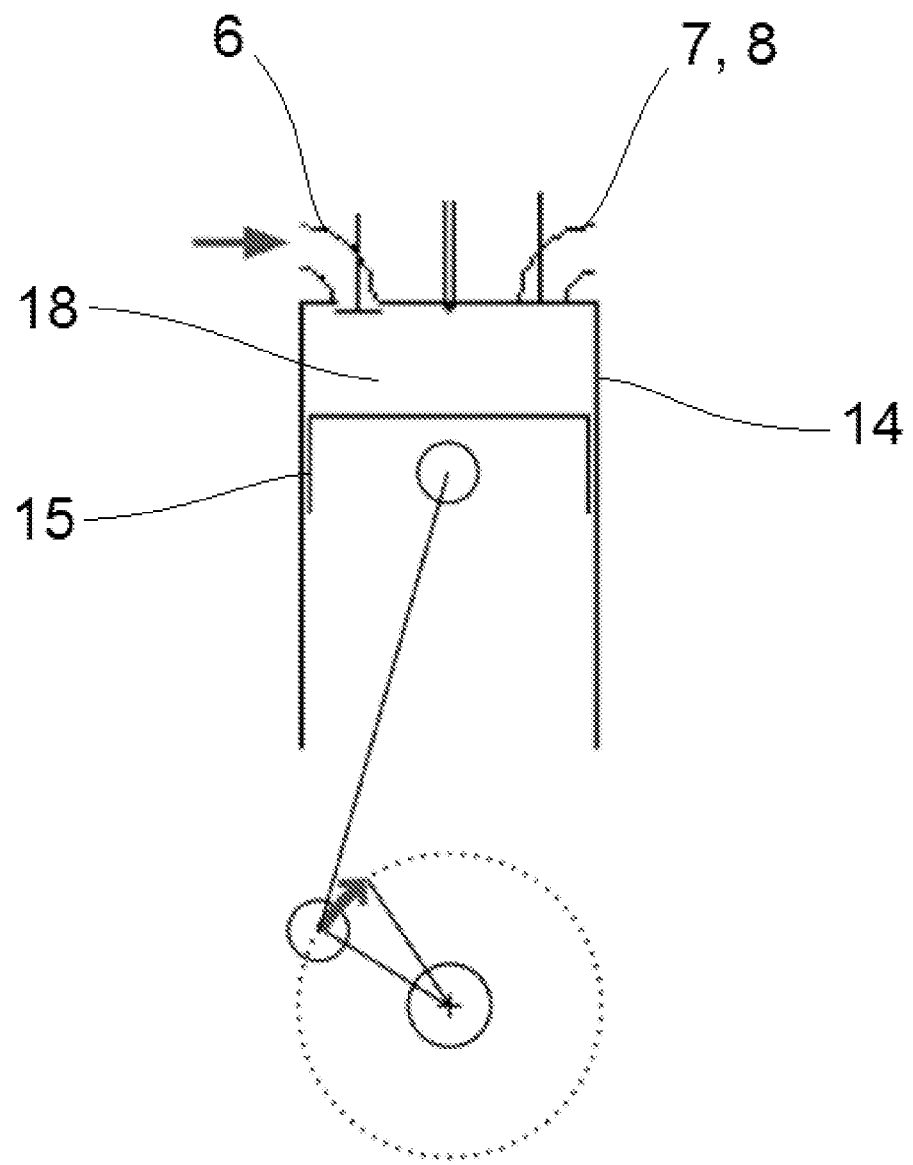
FIG. 2D illustrates a schematic cross sectional view of a cylinder of a combustion engine in accordance with at least some embodiments of the present invention during air intake.

In FIG. 2C a schematic cross sectional view of a cylinder 14 of a combustion engine in accordance with at least some embodiments of the present invention during fuel injection is illustrated. In terms of the fault-free operation of the engine 1, it is necessary to control the pressure of the combustion gases in the cylinder 14. Also the amount of the combustion-gas residue in the cylinder 14 of the engine is controlled so that the injection of fuel into the gas contained in the cylinder 14 will function well before the introduction of a new gas-charge into the cylinder 14 as shown in FIG. 2D. The fuel may be, for example, injected into the cylinder 14 in the form of a conical jet 16. The pressure of the gas contained in the cylinder 14 may be less than 3 bar, for instance.

In FIG. 2D a schematic cross sectional view of a cylinder 14 of a combustion engine 1 in accordance with at least some embodiments of the present invention during air intake is illustrated. The inlet valves 6 have been opened in order to allow a new gas charge to flow into the cylinder 14. The temperature of the mixture 18 of combustion gases, the scavenging gas, and fuel vapour in the cylinder 14 will drop sufficiently, so that the temperature of the aforementioned mixture in the cylinder 14, when the piston 15 has compressed it to its top dead centre as shown in FIG. 2E, will be sufficiently low to prevent self-ignition of the mixture.

Figure 2E:
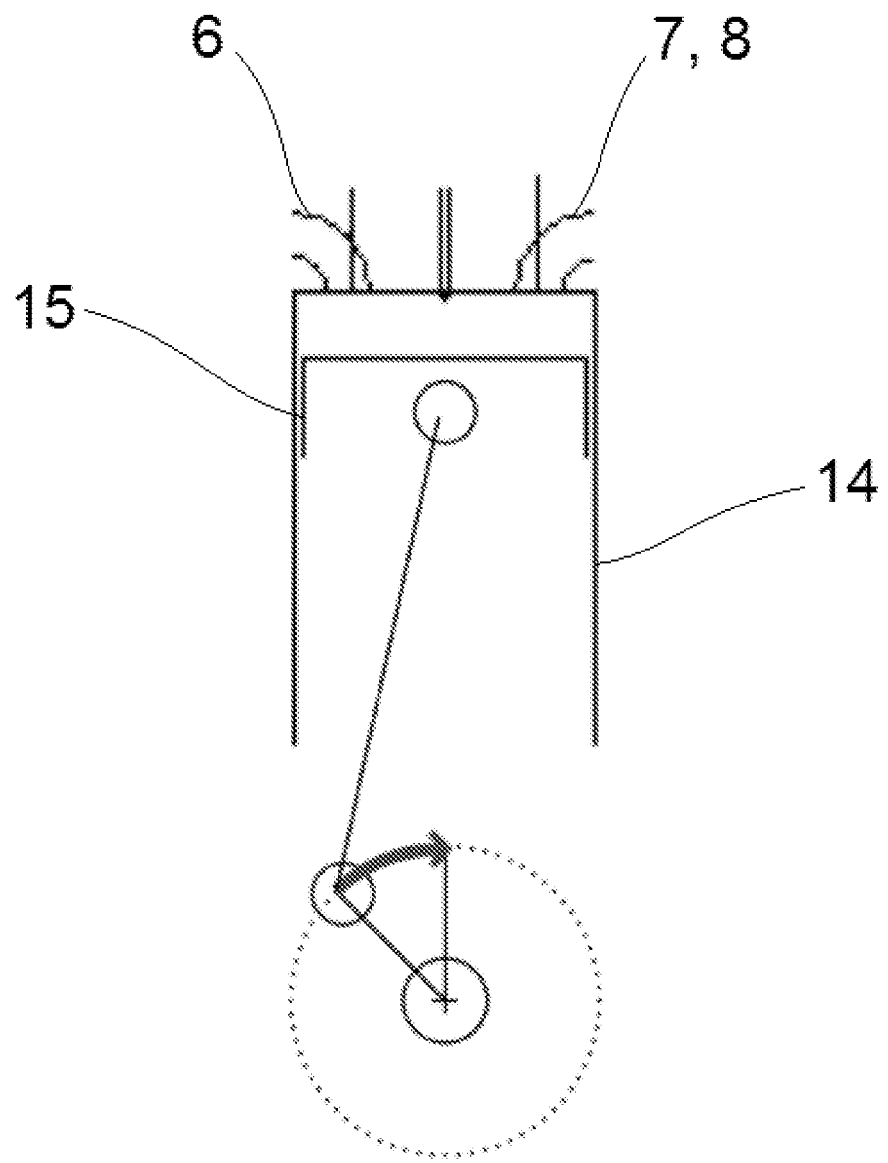
FIG. 2E illustrates a schematic cross sectional view of a cylinder of a combustion engine in accordance with at least some embodiments of the present invention during final compression.

In FIG. 2E a schematic cross sectional view of a cylinder 14 of a combustion engine 1 in accordance with at least some embodiments of the present invention during final compression is illustrated.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in internal combustion engines and methods of operating internal combustion engines.

REFERENCE SIGNS LIST 1 combustion engine
2 turbocharger
3 first intercooler
4 compressor
5 second intercooler
6 inlet valve
7 first exhaust valve
8 second exhaust valve
9 intercooler bypass
10 throttle valve
11 turbocharger turbine
12 turbine bypass duct
13 exhaust duct
14 cylinder
15 piston
16 conical jet
17 combustion chamber
18 mixture
19 ignition fuel

CITATION LIST

Patent Literature

DE 3821937 A1
U.S. Pat. No. 5,417,068 A
DE 102008036308 A1
DE 3821935 A1

The invention claimed is:
1. combustion engine system comprising:
a two-stroke engine of a Z-type;
a compressor connected to a turbocharger turbine;
a first intercooler arranged at a position upstream from the compressor;
a second intercooler at a position downstream from the compressor;
a controllable intercooler bypass configured to bypass the second intercooler;
a first exhaust gas channel and a separate second exhaust gas channel, each connected to at least one cylinder of the two-stroke engine;
   wherein the first exhaust gas channel is to discharge exhaust gas from the at least one cylinder of the two-stroke engine to the turbocharger turbine; and
   wherein the separate second exhaust gas channel is to discharge the exhaust gas from the at least one cylinder of the two-stroke engine to bypass the turbocharger turbine; and
a throttling valve positioned in the separate second exhaust gas channel;
   wherein the throttling valve is configured to control a pressure of the exhaust gas in the separate second exhaust gas channel based on an amount of the exhaust gas remaining in the at least one cylinder of the two-stroke engine.

2. The combustion engine system according to claim 1, wherein the separate second exhaust gas channel is connected to the first exhaust gas channel at a position downstream of the turbocharger turbine.

3. The combustion engine system according to claim 1, wherein the combustion engine further comprises a first exhaust gas valve configured to control an exhaust gas flow from the cylinder to the first exhaust gas channel and a second exhaust gas valve configured to control an exhaust gas flow from the cylinder to the second exhaust gas channel.

4. The combustion engine system according to claim 1, wherein the combustion engine comprises a controllable compressor.

5. The combustion engine system according to claim 4, wherein the compressor is configured to provide the cylinder with a gas charge under high pressure.

6. The combustion engine system according to claim 1, wherein the combustion engine is configured to provide the cylinder with a gas charge in the range between about 60-30 crank degrees before a piston's top dead center.

7. The combustion engine system according to claim 1, wherein the combustion engine is configured to provide the cylinder with a gas charge subsequent to closing of the first and second exhaust gas valves.

8. The combustion engine system according to claim 1, wherein the throttling valve is configured to control a temperature of a mixture in the cylinder based on an amount of the mixture passing through the throttling valve.

9. A method of operating an internal combustion engine comprising a first exhaust gas channel connected to a turbocharger turbine, a separate second exhaust gas channel configured to bypass the turbocharger turbine, the method comprising:
   opening a first exhaust gas valve to discharge exhaust gas from at least one cylinder of a Z-type two-stroke combustion engine through the first exhaust gas channel;
   opening a second exhaust gas valve to discharge the exhaust gas from the at least one cylinder of the Z-type two-stroke combustion engine through the a-separate second exhaust gas channel bypass the turbocharger turbine; and
   controlling a pressure of the exhaust gas based on an amount of the exhaust gas remaining in the at least one cylinder by throttling a throttle valve positioned in the separate second exhaust gas channel.

10. The method according to claim 9, further comprising:
   merging the exhaust gas flowing through the second exhaust gas channel with the exhaust gas flowing through the first exhaust gas channel at a position downstream of the turbocharger turbine.

11. The method according to claim 8, further comprising:
   controlling a temperature of a mixture in the at least one cylinder by throttling the throttle valve positioned in the separate second exhaust gas channel.

\* \* \* \* \*